US007047390B2

United States Patent
Factor et al.

(10) Patent No.: US 7,047,390 B2
(45) Date of Patent: May 16, 2006

(54) METHOD, SYSTEM, AND PROGRAM FOR MANAGING A RELATIONSHIP BETWEEN ONE TARGET VOLUME AND ONE SOURCE VOLUME

(75) Inventors: Michael E. Factor, Haifa (IL); Amiram Hayardeny, Binyamina (IL); Thomas Charles Jarvis, Tucson, AZ (US); Gail Andrea Spear, Tucson, AZ (US); William Frank Micka, Tucson, AZ (US); Sivan Tal, Yokneam Illit (IL); Dalit Tzafrir, Haifa (IL); Rivka Mayraz Matosevich, Zichron-Ya'acov (IL); Sheli Rahav, Haifa (IL); Ifat Nuriel, Haifa (IL); Shachar Fienblit, Bin Ayala (IL); Svetlana Shukevich, Yaar Odem (IL)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 10/463,968

(22) Filed: Jun. 17, 2003

(65) Prior Publication Data

US 2004/0260869 A1   Dec. 23, 2004

(51) Int. Cl.
*G06F 12/00* (2006.01)
(52) U.S. Cl. .................. 711/202; 711/162; 711/202; 707/203
(58) Field of Classification Search .................. None
See application file for complete search history.

(56) References Cited

U.S. PATENT DOCUMENTS

| 6,076,148 | A | 6/2000 | Kedem |
| 6,189,079 | B1 | 2/2001 | Micka et al. |
| 6,205,450 | B1 * | 3/2001 | Kanome ............ 707/203 |
| 6,405,294 | B1 | 6/2002 | Hayter |
| 6,611,901 | B1 | 8/2003 | Micka et al. |
| 6,799,258 | B1 * | 9/2004 | Linde ............ 711/162 |
| 6,898,688 | B1 * | 5/2005 | Martin et al. ........ 711/202 |

* cited by examiner

OTHER PUBLICATIONS

U.S. Appl. No. 10/463,997, filed Jun. 17, 2003, entitled "Method, System, and Program For Managing Information on Relationships Between Target Volumes and Source Volumes When Performing Adding, Withdrawing, and Disaster Recovery Operations for the Relationships", invented by Michael E Factor; Amiram Hayardeny; Thomas C. Jarvis; Gail A. Spear; William F. Micka; Sivan Tal; Dalit Tzafrir; Rivka M. Matosevich; Sheli Rahav; Ifat Nuriel; Shachar Fienblit; and Svetlana Shukevich.

*Primary Examiner*—Mano Padmanabhan
*Assistant Examiner*—Duc T Doan
(74) *Attorney, Agent, or Firm*—David W. Victor; Konrad Raynes & Victor LLP

(57) ABSTRACT

Provided are a method, system, and program for managing a relationship between one target volume and one source volume. For each of the source volume and target volume, the memory includes: (i) at least one element, wherein each element represents a range of sequential data units in the volume; (ii) at least one relationship entry, wherein each relationship entry represents one relationship; (iii) at least one element pointer associating one element with one relationship entry, wherein the data units represented by the element are part of the relationship represented by the relationship entry that the pointer associates with the element; and (iv) one relationship pointer for each relationship entry associating the relationship entry with volume metadata, wherein the volume metadata provides information on the relationship represented by the relationship entry.

39 Claims, 14 Drawing Sheets

METHOD, SYSTEM, AND PROGRAM FOR MANAGING A RELATIONSHIP BETWEEN ONE TARGET VOLUME AND ONE SOURCE VOLUME

BACKGROUND OF THE INVENTION

1. Field of the Invention

The present invention relates to a method, system, and program for managing a relationship between one target volume and one source volume, 2. Description of the Related Art Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space comprised of numerous hard disk drives connected in a loop architecture, otherwise referred to as a Direct Access Storage Device (DASD). Hosts may communicate Input/Output (I/O) requests to the storage space through the storage controller.

In many systems, data on one storage device, such as a DASD, may be copied to the same or another storage device so that access to data volumes can be provided from two different devices. A point-in-time copy involves physically copying all the data from source volumes to target volumes so that the target volume has a copy of the data as of a point-in-time. A point-in-time copy can also be made by logically making a copy of the data and then only copying data over when necessary, in effect deferring the physical copying. This logical copy operation is performed to minimize the time during which the target and source volumes are inaccessible.

One such logical copy operation is known as FlashCopy® (FlashCopy is a registered trademark of International Business Machines, Corp. or "IBM"). FlashCopy® involves establishing a logical point-in-time relationship between source and target volumes on different devices. The Flash-Copy function guarantees that until a track in a FlashCopy relationship has been hardened to its location on the target disk, the track resides on the source disk. A relationship table is used to maintain information on all existing FlashCopy relations in the subsystem. During the establish phase of a FlashCopy relationship, one entry is recorded in the source and target relationship tables for the source and target that participate in the FlashCopy being established. Each added entry maintains all the required information concerning the FlashCopy relation. Both entries for the relationship are removed from the relationship tables when all FlashCopy tracks from the source extent have been copied to the target extents or when a withdraw command is received.

The target relationship table further includes a bitmap that identifies which tracks involved in the FlashCopy relationship have not yet been copied over and are thus protected tracks. Each track in the target device is represented by one bit in the bitmap. The target bit is set when the corresponding track is established as a target track of a FlashCopy relationship. The target bit is reset when the corresponding track has been copied from the source location and destaged to the target device due to writes on the source or the target device, or a background copy task.

In the prior art, as part of the establishment of the logical point-in-time relationship during the FlashCopy® operation, all tracks in the source cache that are included in the FlashCopy® must be destaged to the physical source volume, e.g., source DASD, and all tracks in the target cache included in the FlashCopy® must be discarded. Further details of the FlashCopy® operations are described in the copending and commonly assigned U.S. patent application Ser. No. 09/347,344, filed on Jul. 2, 1999, entitled "Method, System, and Program for Maintaining Electronic Data as of a Point-in-Time", which patent application is incorporated herein by reference in its entirety.

Once the logical relationship is established, hosts may then have immediate access to data on the source and target volumes, and the data may be copied as part of a background operation. A read to a track that is a target in a FlashCopy relationship and not in cache triggers a stage intercept, which causes the source track corresponding to the requested target track to be staged to the target cache when the source track has not yet been copied over and before access is provided to the track from the target cache. This ensures that the target has the copy from the source that existed at the point-in-time of the FlashCopy® operation. Further, any writes to tracks on the source device that have not been copied over triggers a destage intercept, which causes the tracks on the source device to be copied to the target device.

SUMMARY OF THE DESCRIBED IMPLEMENTATIONS

Provided are a method, system, and program for managing a relationship between one target volume and one source volume. For each of the source volume and target volume, the memory includes: (i) at least one element, wherein each element represents a range of sequential data units in the volume; (ii) at least one relationship entry, wherein each relationship entry represents one relationship; (iii) at least one element pointer associating one element with one relationship entry, wherein the data units represented by the element are part of the relationship represented by the relationship entry that the pointer associates with the element; and (iv) one relationship pointer for each relationship entry associating the relationship entry with volume metadata, wherein the volume metadata provides information on the relationship represented by the relationship entry.

In further implementations, the source and target volume metadata is stored in non-volatile storage within the source and target volumes, respectively.

Yet further, the volume metadata is processed to generate in memory the at least one element, the at least one relationship entry, the at least one element pointer, and the at least one relationship pointer.

In additional implementations, the volume metadata is processed on a plurality of volumes, and wherein one set of elements, relationship entries, element pointers, and relationship pointers are generated for each volume including volume metadata identifying relationships of the volume to one other volume.

Still further, generating in the memory the at least one element may further comprise processing the volume metadata to determine each range of data units included in each relationship and generating one element for each range of data units included in at least one relationship.

Yet further, generating in the memory the at least one element may further comprise generating elements including ranges of data units preceding or subsequent to ranges of data units in elements included in one relationship, wherein all the generated elements together represent all user data units in the volume, including ranges of data units in relationships and ranges of data units not included in relationships.

Described implementations provide information on relationships between source and target volumes, and an association of such information in the memory to make such relationship information available.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
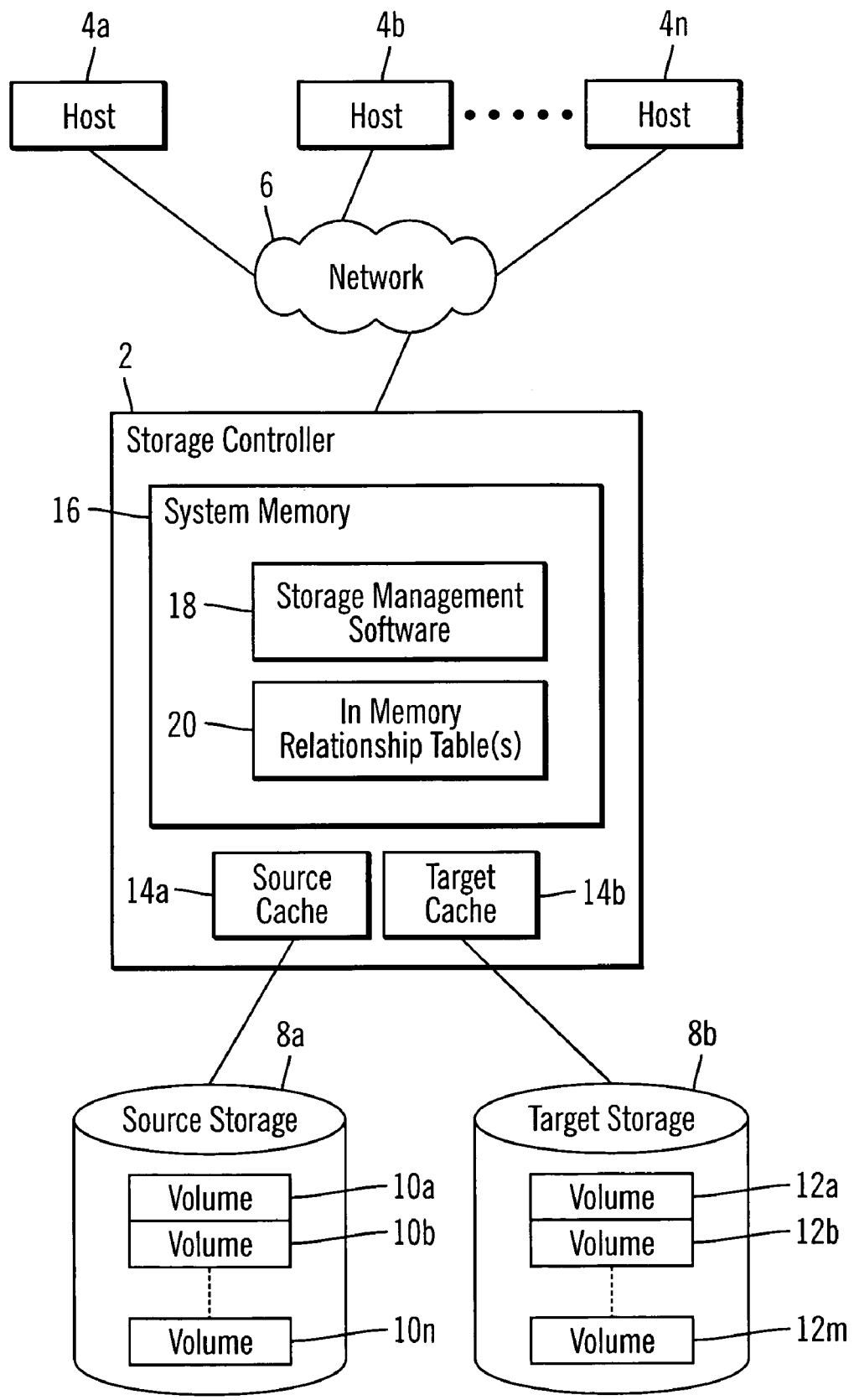
FIG. 1 illustrates a computing environment in which aspects of the invention are implemented.

FIG. 1 illustrates a computing architecture in which aspects of the invention are implemented. A storage controller 2 would receive Input/Output (I/O) requests from host systems 4a, 4b ... 4n over a network 6 directed toward storage devices 8a, 8b configured to have volumes (e.g., Logical Unit Numbers, Logical Devices, etc.) 10a, 10b ... 10n and 12a, 12b ... 12m, respectively, where m and n may be different integer values or the same value. The storage controller 2 further includes a source cache 14a to store I/O data for tracks in the source storage 8a and a target cache 14b to store I/O data for tracks in the target storage 8b. The source 14a and target 14b caches may comprise separate memory devices or different sections of a same memory device. The caches 14a, 14b are used to buffer read and write data being transmitted between the hosts 4a, 4b ... 4n and the storages 8a, 8b. Further, although caches 14a and 14b are referred to as source and target caches, respectively, for holding source or target tracks in a point-in-time copy relationship, the caches 14a and 14b may store at the same time source and target tracks in different point-in-time copy relationships.

The storage controller 2 also includes a system memory 16, which may be implemented in volatile and/or non-volatile devices. Storage management software 18 executes in the system memory 16 to manage the copying of data between the different storage devices 8a, 8b, such as the type of logical copying that occurs during a FlashCopy® operation. The storage management software 18 may perform operations in addition to the copying operations described herein. The system memory 16 may be in a separate memory device from caches 14a, 14b or a part thereof. The storage management software 18 maintains one in-memory relationship table 20 in the system memory 16 providing information on point-in-time copy relationships for each volume managed by the storage controller 2, where there may be one in-memory relationship table 20 for each volume. In certain implementations, tracks are subject to the copy relationship. However, other data units may be subject to a copy relationship, such as blocks, sub-blocks of a track, etc., where for each source data unit in the relationship there is a corresponding target data unit.

The storage controller 2 would further include a processor complex (not shown) and may comprise any storage controller or server known in the art, such as the IBM Enterprise Storage Server (ESS)®, 3990® Storage Controller, etc. (Enterprise Storage Server is a registered trademark of IBM). The hosts 4a, 4b ... 4n may comprise any computing device known in the art, such as a server, mainframe, workstation, personal computer, hand held computer, laptop, telephony device, network appliance, etc. The storage controller 2 and host system(s) 4a, 4b ... 4n communicate via a network 6, which may comprise a Storage Area Network (SAN), Local Area Network (LAN), Intranet, the Internet, Wide Area Network (WAN), etc. The storage systems 8a, 8b may comprise an array of storage devices, such as a Just a Bunch of Disks (JBOD), Redundant Array of Independent Disks (RAID) array, virtualization device, etc.

Figure 2:
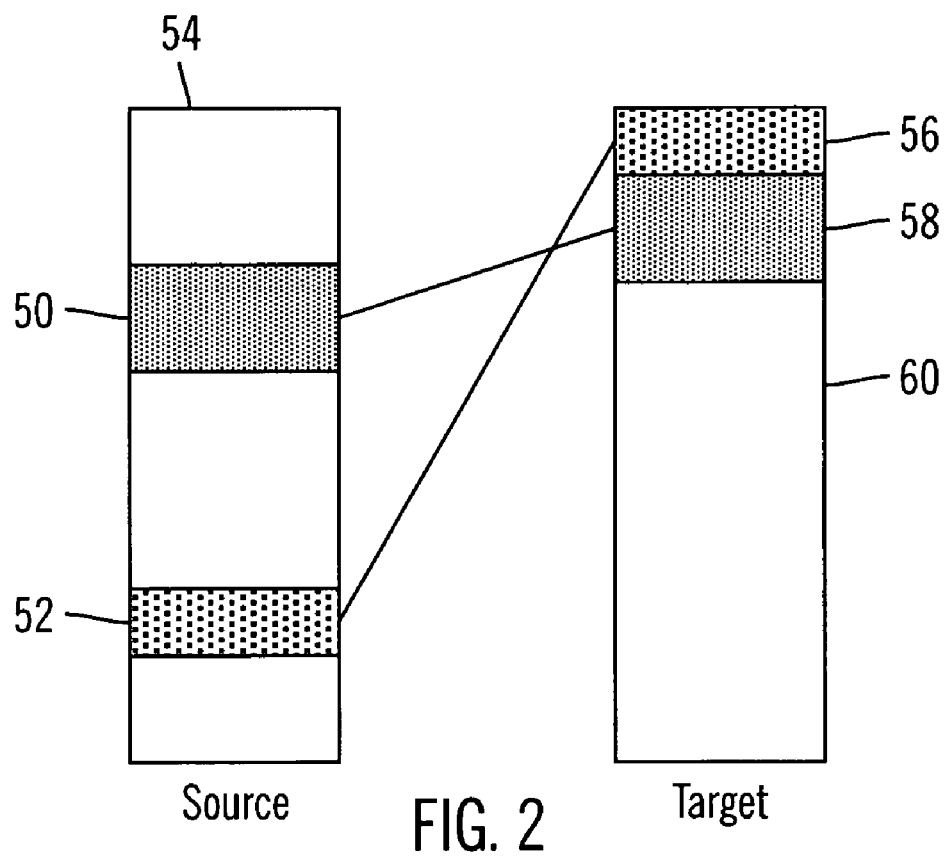
FIGS. 2 and 3 illustrate a relationship between tracks in a source volume and tracks in a target volume in accordance with implementations of the invention.

A point-in-time copy may be established between a range of tracks on a source volume and a range of tracks on a target volume, where the track numbers of the source and target volumes involved in the relationship may be the same or different. In certain implementations, the source extent and target extent may be at different relative offsets from the beginning of their respective volumes. This allows reorganizing data sets, for instance, to coalesce a set of discontinuous data sets into a contiguous set of tracks. FIG. 2 illustrates how non-contiguous source extents 50 and 52 located in the middle of the source volume 54 are relocated to target extents 56 and 58 at the beginning of a target volume 60 and occur in a different order in the source 54 and target 60.

Figure 3:
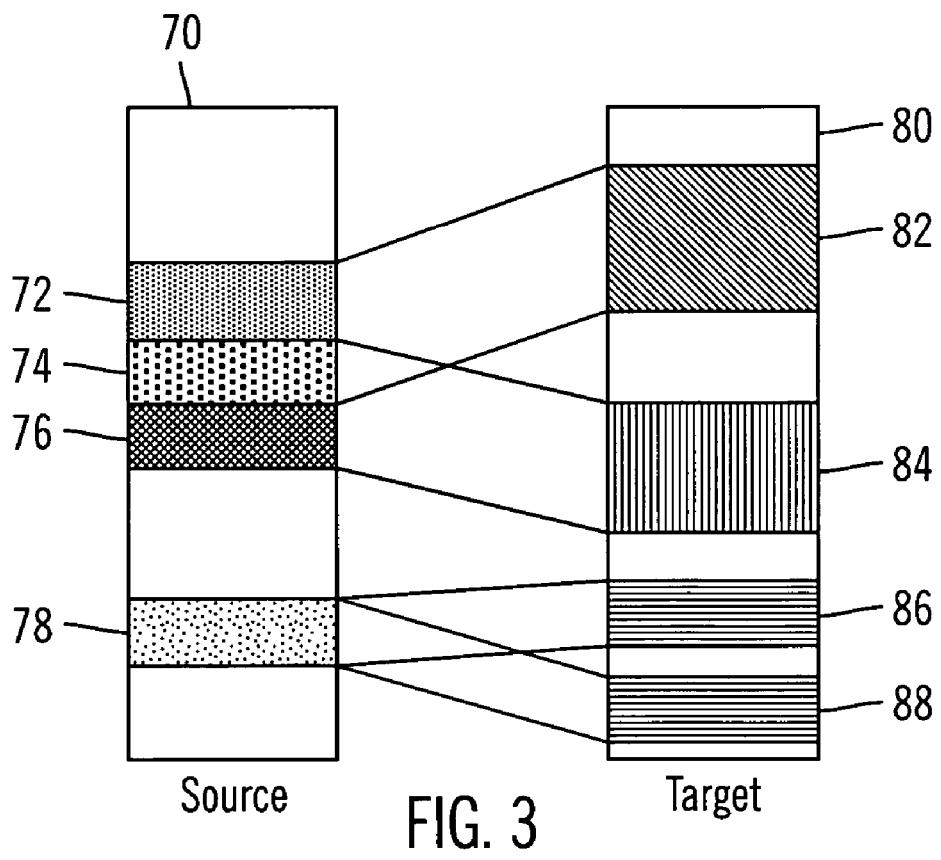

Described implementations further allow multiple point-in-time copy relations per track where a given extent (range) of tracks can concurrently be part of more than one point-in-time copy relation. A track can belong to either a source extent or a target extent. Further, a track may belong to multiple source relations, but in certain implementations, only a single target relationship is allowed. FIG. 3 illustrates multiple relations per track, where a source volume 70 has extents (ranges of tracks) 72, 74, 76, and 78 that map to different target extents 82, 84, 86, and 88 in target volume 80. The source extents 72 and 74 are related to target extent 82 and source extents 74 and 76 relate to target extent 84, such that these two relationships share an overlapping extent 74 of tracks. Further, source extent 78 relates to multiple target extents 86 and 88 and source extent 74 also relates to multiple target extents 82 and 84. Although multiple targets are shown in the same volume in this example, the target tracks could be on different volumes.

Figure 4:
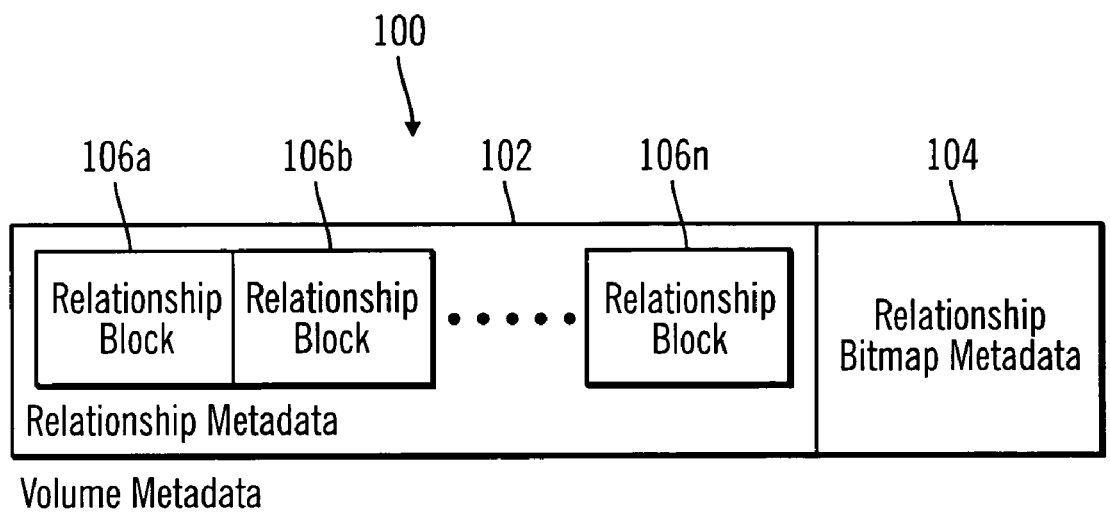
FIGS. 4, 5, 6, 7, and 8 illustrate embodiments of information maintained to represent a relationship of source and target tracks in a copy relationship in accordance with implementations of the invention.
Figure 5:
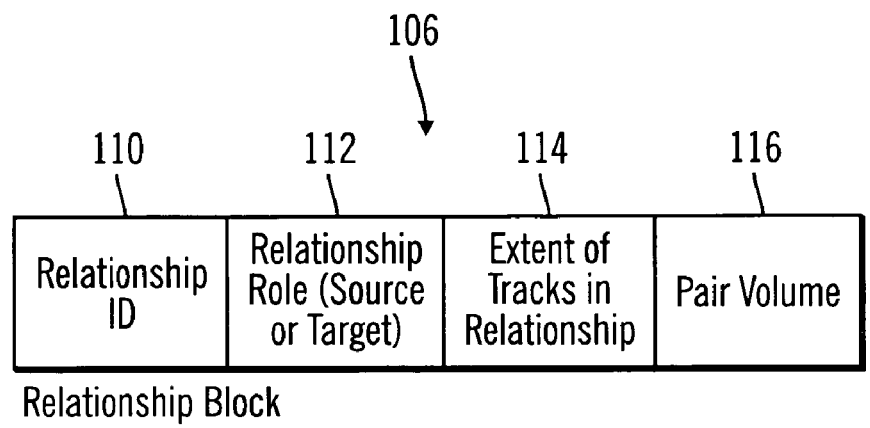

When a point-in-time copy relationship is established between an extent of tracks in a source volume and an extent in a target volume, persistent information on the relationship would be stored in volume metadata in the source and target volumes 10a, 10b . . . 10n, 12a, 12b . . . 12n. With respect to FIG. 4, the volume metadata 100 for each source and target volume may include metadata components, such as relationship metadata 102, relationship bitmap metadata 104, and a volume generation number. The relationship metadata 102 includes relationship blocks 106a, 106b . . . 106n, each including information on one point-in-time copy for an extent of tracks in the volume. FIG. 5 illustrates further details of a relationship block, such as relationship blocks 106a, 106b . . . 106n in FIG. 4, as including:

Relationship ID 110: provides a unique identifier of the relationship. This number is used by both the source and target to designate the relationship.

Relationship role 112: Indicates whether the extent of tracks in the volume is a source or target in the relationship.

Extent 114: identifies the tracks in the volume including the extent (range) of tracks involved in the point-in-copy relationship.

Volume Pair 116: identifies the other volume in the relationship.

The relationship blocks 106a, 106b . . . 106n may be arranged in a linked list. Blocks in the relationship metadata 102 that are not used may be stored in a free list of free blocks available for use to store relationship information as a relationship block. The relationship blocks 106a, 106b . . . 106n may be of a fixed length and indexed, such that they are accessible through an index.

The bitmap metadata 104 comprises one or more bitmap data structures that provides a bit for each track in the volume. If the bit is "on", then this indicates that the corresponding target track does not yet include the point-in-time data from the source, and that the data must be copied over. The bit values corresponding to a range of extents can be directly mapped to an offset of the relationship bitmap metadata 104.

Figure 6:
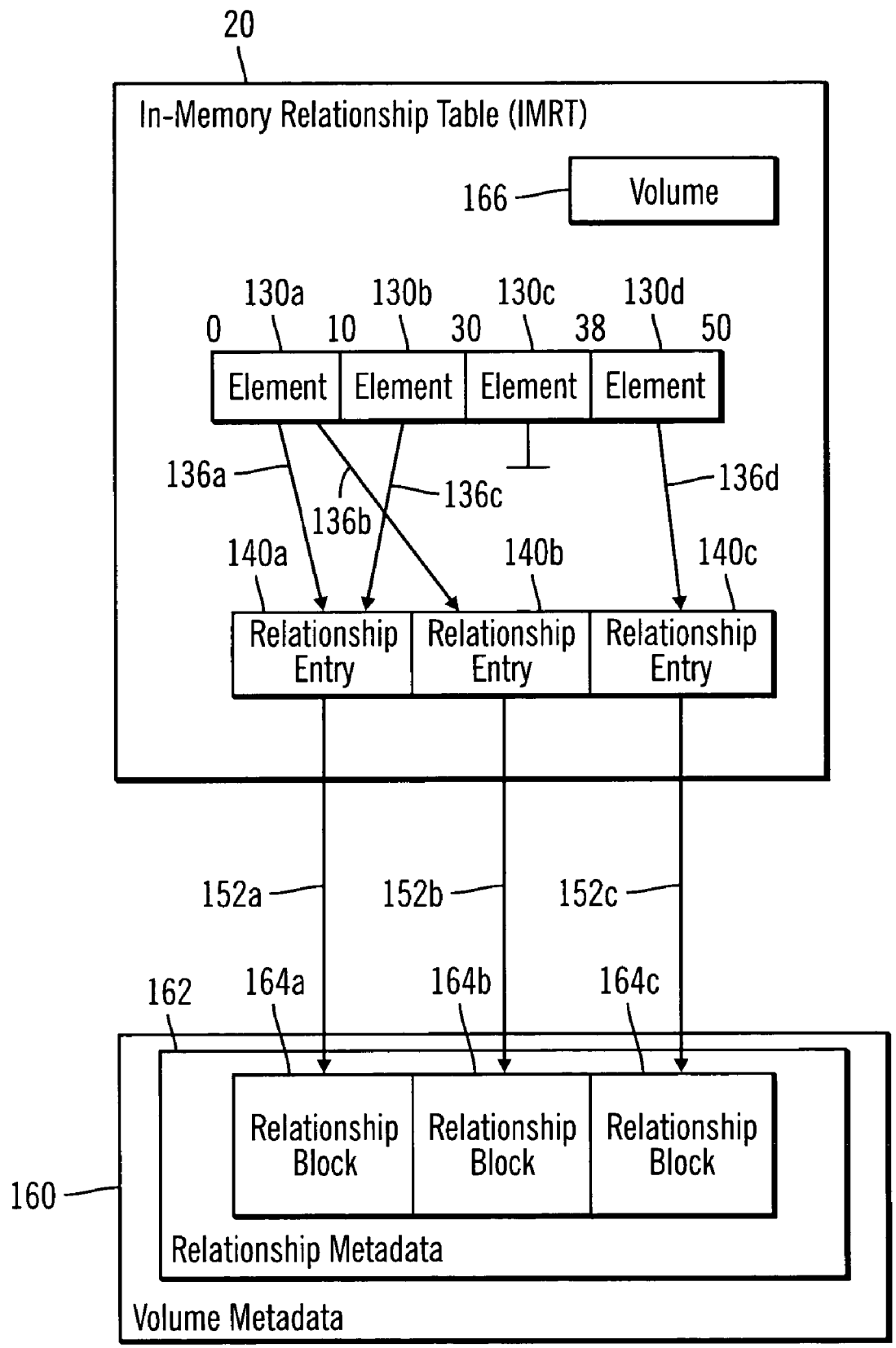
Figure 7:
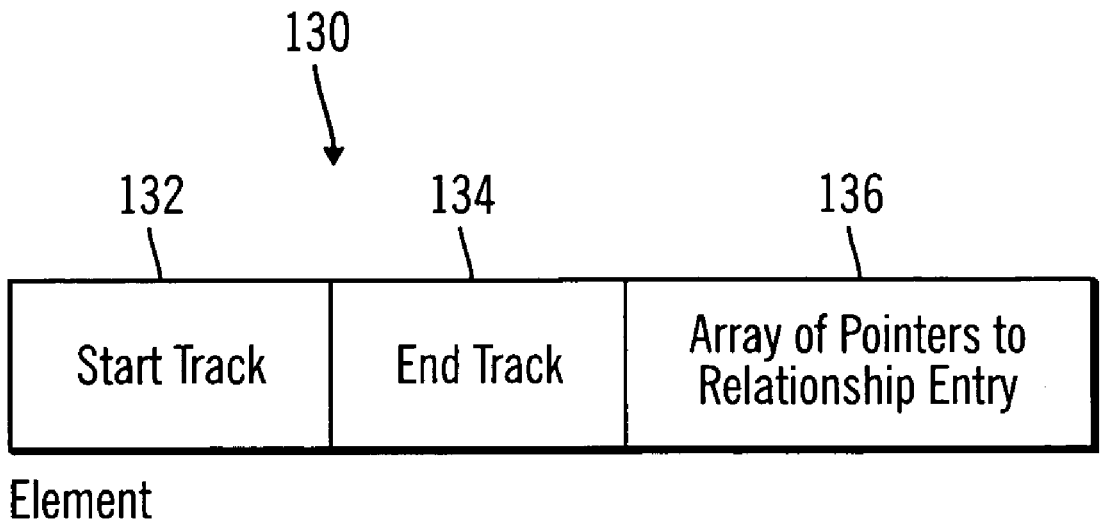

FIG. 6 illustrates a data structure implementation of the in-memory relationship table 20. There may be one in-memory relationship table 20 for each volume managed by the storage controller 2. The in-memory relationship table 20 includes a plurality of elements 130a, 130b, 130c, and 130d, where each element represents an extent of contiguous tracks in the corresponding volume. FIG. 7 illustrates the content of each element 130, such as elements 130a, 130b, 130c, and 130d in FIG. 6, as including a start track 132 and end track 134 representing the start and end of a contiguous range of tracks in the volume and an array of pointers 136 to one or more relationship entries 140a, 140b, and 140c. The relationship entries may or may not be in a linked list. Further multiple elements may point to the same relationship entry 140a, 140b, and 140c. FIG. 6 shows that elements 130a, 130b, and 130d represent ranges of tracks that are included in a point-in-time copy relationship, as represented by pointers 136a, 136b, 136c, and 136d that point to relationship entries 140a, 140b, and 140c, providing information on the relationship including the tracks represented by elements 130a, 130b, and 103d. Element 130c represents a range of tracks that are not included in a point-in-time relationship, as indicated by a lack of any pointer to a relationship entry 140a, 140b, and 140c. If an element, e.g., element 130a includes an array of pointers 136a and 136b that point to different relationship entries 140a and 140b, then such range of tracks is associated with two relationships, indicating that such range is a source to multiple targets.

Figure 8:
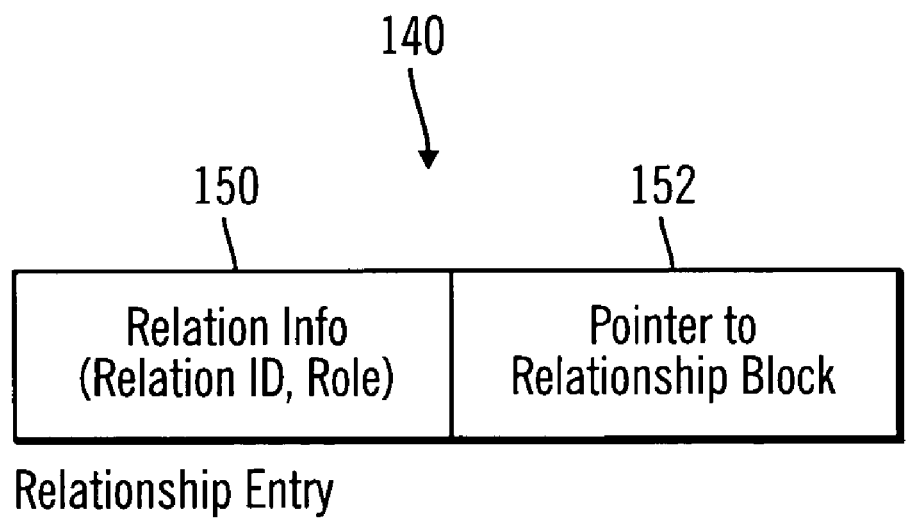

FIG. 8 illustrates content that may be included in each relationship entry 140, such as relationship entries 140a, 140b, and 140c in FIG. 6, including certain of the persistent relationship information 150 from the corresponding relationship block 106a, 106b . . . 106n in the volume metadata 100, such as the relationship role 112 and/or relationship ID 110 (FIG. 5), and a pointer 152 to the relationship block 106 including persistent information for the relationship represented by the relationship entry 140. The pointers 152 in the relationship entries 140 are shown as pointers 152a, 152b, and 152c in FIG. 6. The pointer 152 may further comprise an index to the corresponding relationship block in the relationship metadata 160. FIG. 6 further shows the relationship blocks 164a, 164b, and 164c addressed by the pointers 152a, 152b, and 152c in the relationship metadata 162 portion of the volume metadata 160. The in-memory relationship table (IMRT) 20 further includes volume information 166 identifying the volume 10a, 10b, 10n, 12a, 12b . . . 12n to which the in-memory relationship table 20 pertains.

With the described data structures, much of the relationship information is maintained in persistent storage in the volume metadata 100 stored with the volume 10a, 10b, 10n and 12a, 12b, 12n (FIG. 1). Further, in certain implementations, each member of the relationship, the source and target, would separately maintain the relationship metadata on their respective volumes. In this way, if a volume in a relationship fails, the storage controller 2 will still be able to determine whether the source or target in the point-in-time copy relationship with the failed volume is in fact part of a relationship, thus requiring special handling during destage and stage operations.

Figure 9:
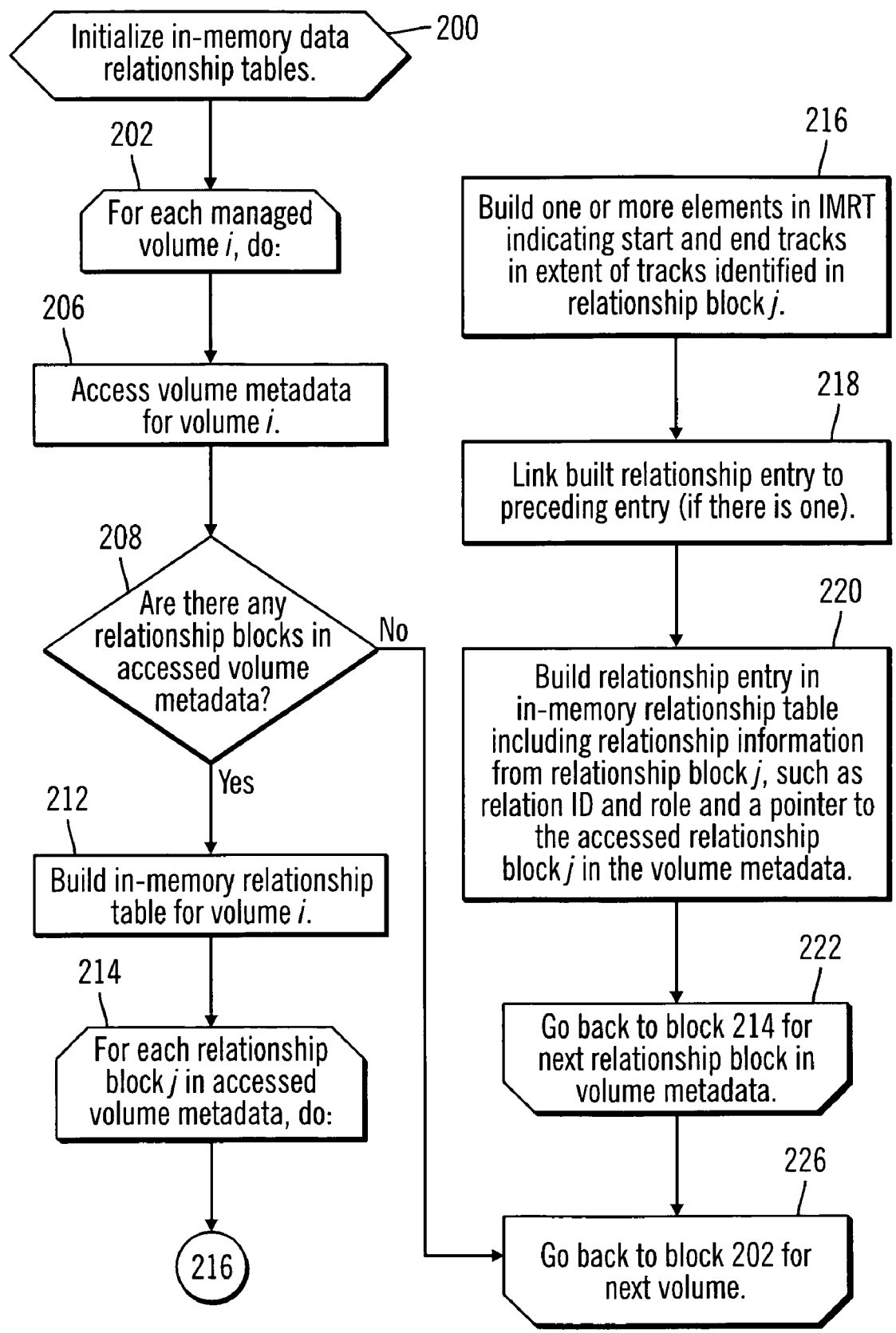
FIG. 9 illustrates operations to initialize in memory relationship information in accordance with implementations of the invention.

FIG. 9 illustrates logic implemented in the storage management software 18 to initialize the in-memory relationship tables (IMRTs) 20 from the volume metadata 100 in the volumes 10a, 10b . . . 10n, 12a, 12b . . . 12m managed by the storage controller 2. Upon beginning the initialization (at block 200), the storage management software 18 performs a loop at blocks 202 through 226 for each volume accessible to the storage controller 2. If (at block 208) there are no relationship blocks 106 in the accessed volume metadata 100 for volume i, then control proceeds to block 226 for next volume and an IMRT 20 is not constructed for volume i. A volatile indication may be made in the volume structures for volume i that there is no IMRT 20 for the volume. Alternatively, if there are no relationship blocks, than an IMRT 20 could be constructed that points to a NULL element indicating no relationships for that volume. Otherwise, if (at block 208) there are relationship blocks 106 for volume i, then an IMRT 20 pointing to no relationship blocks would be constructed (at block 212) in memory 16. A loop is then performed at blocks 214 through 224 for each relationship block j in volume i. For each relationship block j, from the first to last block, one or more elements 130 are built (at block 216) in the IMRT 20 indicating in the start 132 and end 134 fields (FIG. 7), which comprises the start and end tracks identified in the extent of tracks 114 (FIG. 5) in the relationship block j. The constructed element is then linked (at block 218) to the element representing the consecutive preceding tracks in the volume i. The storage management software 18 further constructs (at block 220) a relationship entry 140 in the IMRT 20 including relationship information from the persistent relationship block j, such as the relation ID and role 150 (FIG. 8) and a pointer 152 to the accessed relationship block j in the volume metadata. Further, a link may be added from one relationship to the previous relationship. The pointer may comprise an index into an array of relationship blocks 106a, 106b . . . 106n (FIG. 4). The relationship entries may be organized in an array, where the index of each relationship entry 140a, 140b, 140c in the array may be determined by the index of the corresponding relationship block 164a, 164b, 164c. Control proceeds (at block 222) back to block 214 to process the next relationship block 106 in the volume metadata 102. From block 208 or after processing all the relationship blocks for volume i, control proceeds (at block 226) back to block 202 to process information on a further volume in the devices managed by the storage controller 2.

As a result of the logic of FIG. 9, an IMRT 20 is added to the memory 16 for each volume managed by the storage controller 2 including relationships and used to allow the storage controller 2 to maintain data integrity of point-in-time copy relationships when users perform I/Os with respect to tracks included in a point-in-time copy relationship.

Figure 10A:
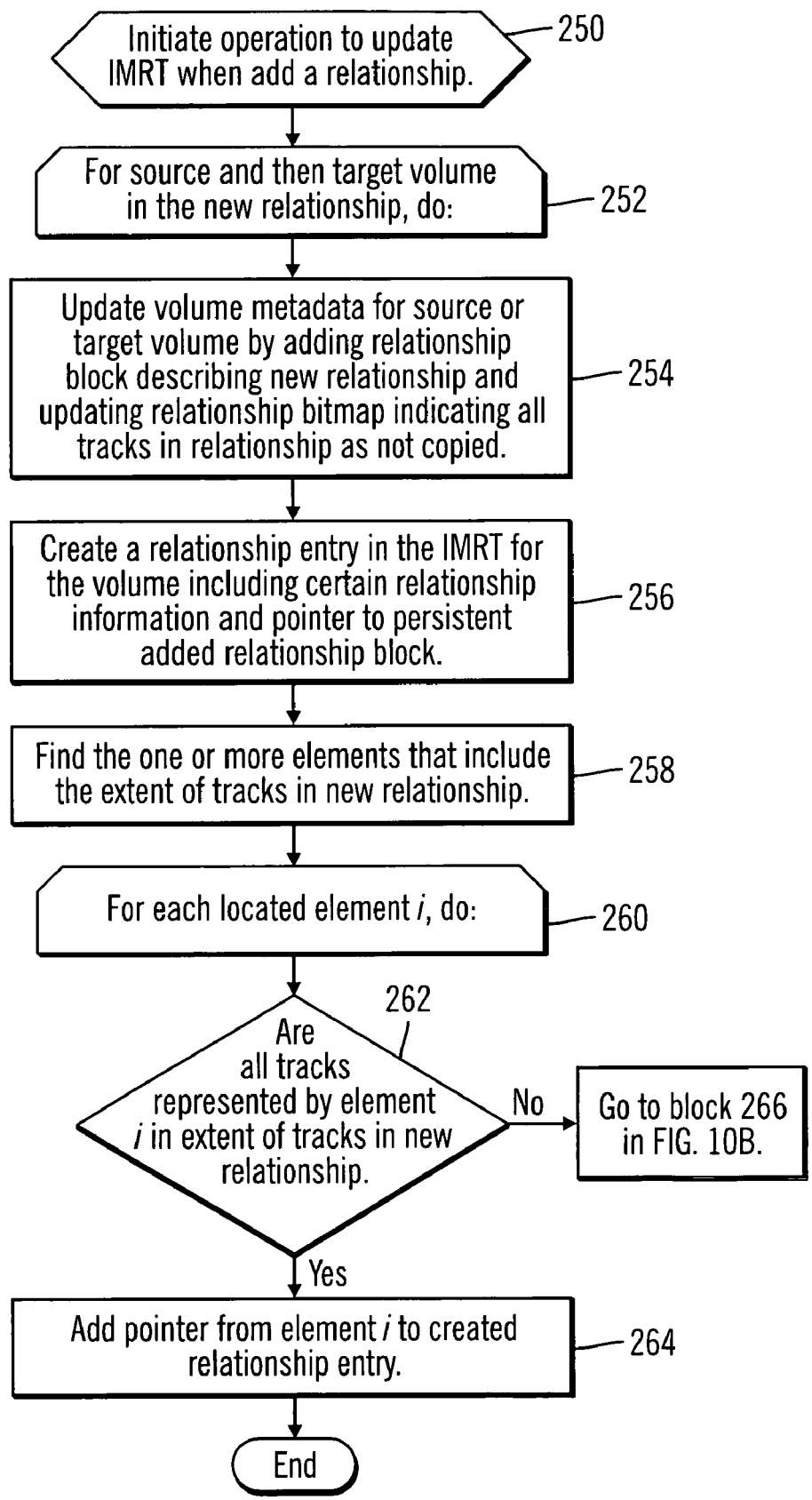
FIGS. 10a and 10b illustrate operations to update relationship information in memory to reflect a new relationship in accordance with implementations of the invention.
Figure 10B:
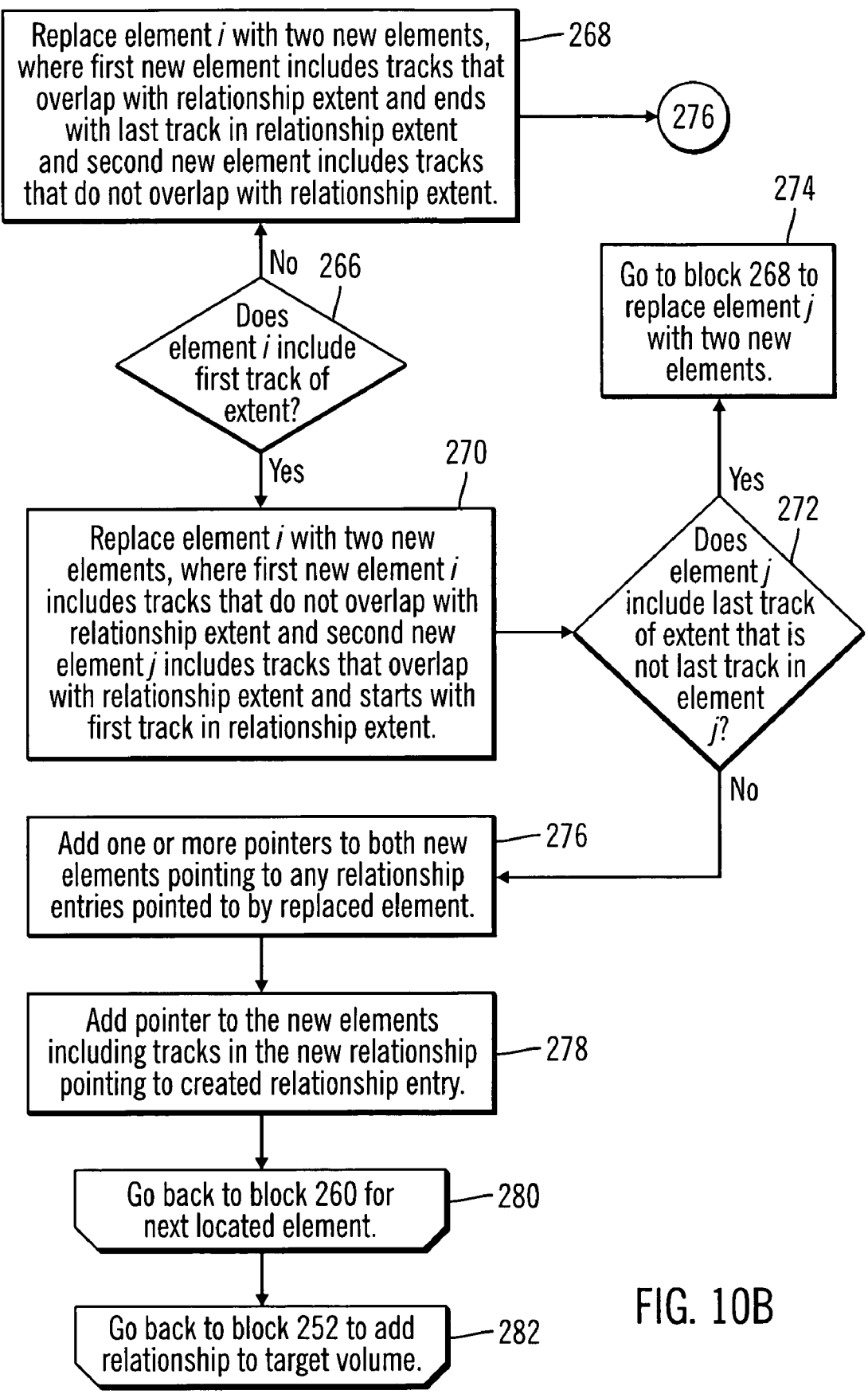

FIGS. 10a and 10b illustrate operations performed by the storage management software 18 to update the IMRTs for a source and target volume in a new established point-in-time copy relationship. With respect to FIG. 10a, upon initiating (at block 250) the update of the IMRT to reflect an added relationship, a loop is performed at blocks 252 through 282 for first the source volume and then for the target volume in the relationship. At block 254, the volume metadata 100 (for first the source and then target) is updated by adding relationship blocks to each providing information on the new relationship and updating the relationship bitmap 104 to indicate that all tracks in the new relationship have not been copied from source to target. After adding information on the relationship to the persistent metadata, a relationship entry 140 is generated (at block 256) in the IMRT 20 for the volume (source or target) including certain relationship information 150 (FIG. 8) and a pointer 152 to the persistent relationship block 164a, 164b, 164c in the source or target volume is generated for the relationship entry 140 to associate the representation of the relationship in memory (the relationship entry 140) with the corresponding persistent relationship block 106 in storage. The storage management software 18 then locates (at block 258) the one or more elements 130 that include the extent of tracks in the new relationship.

If (at block 262) all tracks represented by element i are within the extent of tracks in the new relationship, then a pointer 136 is added (at block 264) associating element i with the relationship entry 140 representing the new relationship. Otherwise, if (at block 262) only a portion of the tracks represented by element i overlap with the extent of tracks in the new relationship, then, with respect to FIG. 10b, a determination is made (at block 266) whether element i includes the first track of the extent of tracks in the new relationship. If element i (from the no branch of block 266) includes the last track of the extent of tracks in the new relationship, then element i is replaced (at block 268) with two new elements, where the first new element includes tracks that overlap with the relationship extent and ends with the last track in the extent of tracks in the new relationship and the second new element includes tracks that do not overlap with the relationship extent. If element i (from the yes branch of block 266) includes the first track of the extent, then element i is replaced (at block 270) with two new elements, where the first new element i includes tracks that do not overlap with the relationship extent and the second new element j includes tracks that overlap with relationship extent and starts with the first track in the relationship extent. If (at block 272) element j includes the last track of the extent that is also not the last track in element j, then the operation at block 268 is performed (at block 274) for element j to perform a further split to extract tracks at the end of element j that do not overlap with the extent and place such non-overlapping tracks in a further element. The two or three new elements would be added in the linked list of elements where the replaced element was located.

After replacing element i with two or three new elements, one or more pointers 136 are added (at block 276) to the two or three new elements 130 to any relationship entries pointed to by the replaced element i. A pointer 130 is then added (at block 278) to the new elements including tracks from the new relationship that points the created relationship entry 140 to associate the new elements representing tracks in the relationship extent with the relationship entry representing the relationship. Control then proceeds (at block 280) back to block 260 in FIG. 10a for the next located element including tracks in the new relationship. After processing all relevant elements for the source volume in the new relationship, control proceeds (at block 282) back to block 252 to update the IMRT 20 for the target volume to reflect the added point-in-time copy relationship.

Figure 11:
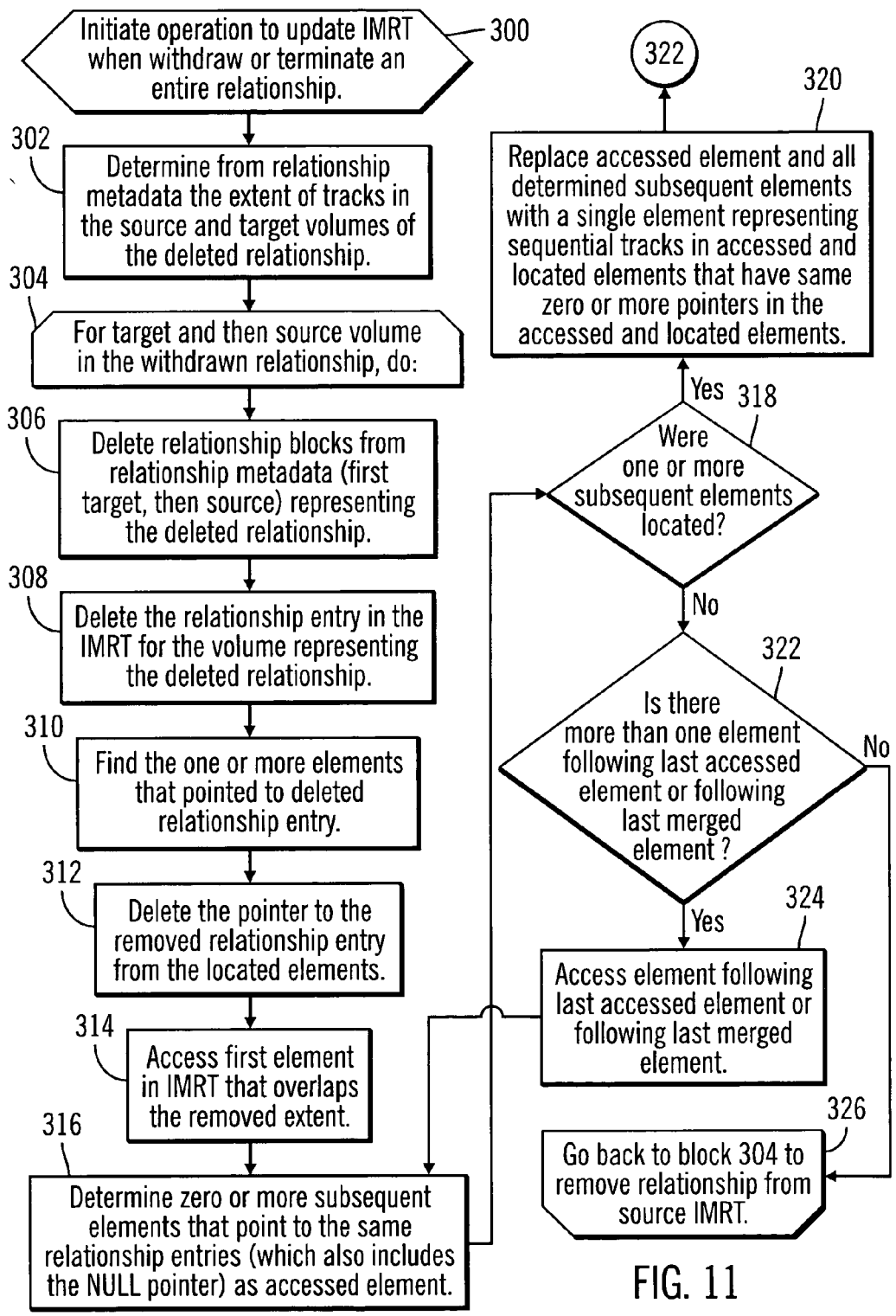
FIGS. 11, 12a and 12b illustrate operations to update relationship information in memory to reflect a withdrawal of tracks from a relationship in accordance with implementations of the invention.

FIG. 11 illustrates operations performed by the storage management software 18 to withdraw or terminate an entire relationship. The operations of FIG. 11 may be performed after all the tracks in the point-in-time copy relationship have been copied from the source to target volumes. Alternatively, an entire relationship may be withdrawn by an administrator deciding to end the entire relationship. Upon initiating (at block 300) the operation to withdraw an entire relationship, the storage management software 18 determines (at block 302) from the relationship metadata 102 in the source and target volumes the extent of source and target tracks of the deleted relationship. The withdrawal request may provide relation extents, which can then be used to query the IMRT 20 and/or relationship metadata 102 to locate the volume metadata in the source and the target volumes, which would include the specified extents 114 or relationship ID 110 (FIG. 5) in the relationship. A loop is then performed at blocks 304 through 326 for first the target volume in the withdrawn relationship and then, second, the source volume. At block 306, the relationship blocks 106 in the source and target volume metadata 102 representing the withdrawn relationship are then deleted. The relationship entry 140 in the IMRTs 20 for the (target and then source) volume representing the deleted relationship is removed (at block 308). The storage management software 18 then locates (at block 310) the one or more elements 130 that address the deleted relationship entry 140 and deletes (at block 312) the pointer 136 to the removed relationship entry 140 from the located elements.

After deleting the information on the withdrawn relation, the storage management software 18 then begins a process at block 314 to merge any elements that point to the exact same relationship entries or no relationship entries. At block 314, the storage management software 18 accesses the first element 130a (FIG. 6) in the IMRT 20 that overlaps the removed extent and determines (at block 316) zero or more subsequent contiguous elements that point to the same relationship entries or that all point to no relationship entry as the accessed element. If (at block 318) one or more subsequent elements 130 are located, then the accessed element and all determined subsequent elements are replaced (at block 320) with a single element representing all the sequential tracks in the accessed and located elements that have the same zero or more pointers 136 in the accessed and located elements. If (at block 318) no subsequent elements 130 are located, then a determination is made (at block 322) of whether there is more than one element following the last accessed element (if no merger occurred from no branch of block 318) or following the last merged element (if a merger occurred from block 320). If there are further elements that can be merged, then the storage management software 18 accesses (at block 324) the element following the last accessed element (if no merger occurred) or the located merged element (if merger occurred). After accessing the next element (at block 324) control proceeds back to block 316 to attempt to merge the next accessed element with subsequent elements. If (at block 322) there are not multiple elements available for merger, then control proceeds (at block 326) back to block 304 to remove the withdrawn relationship from the source IMRT 20.

Figure 12A:
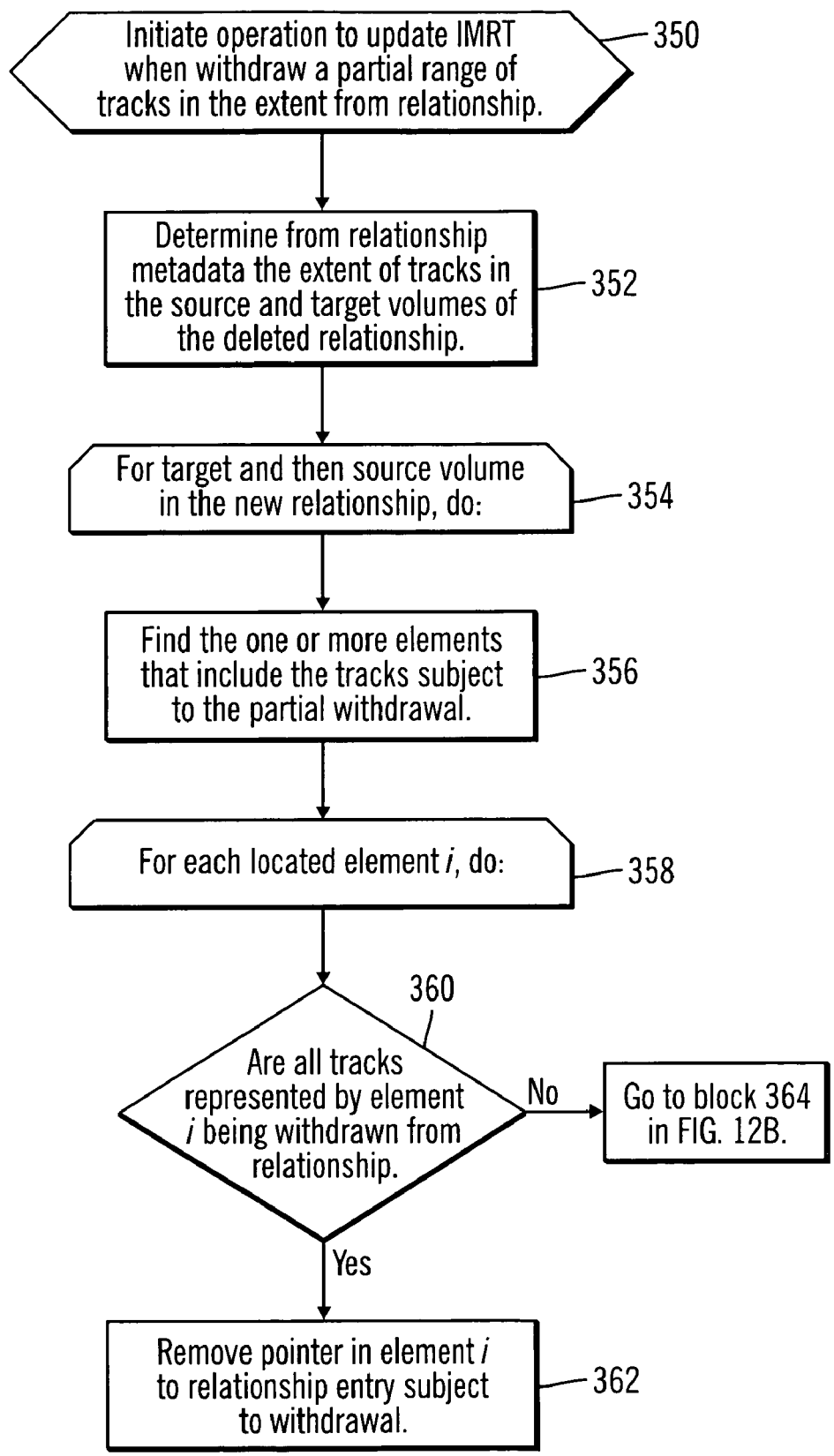
Figure 12B:
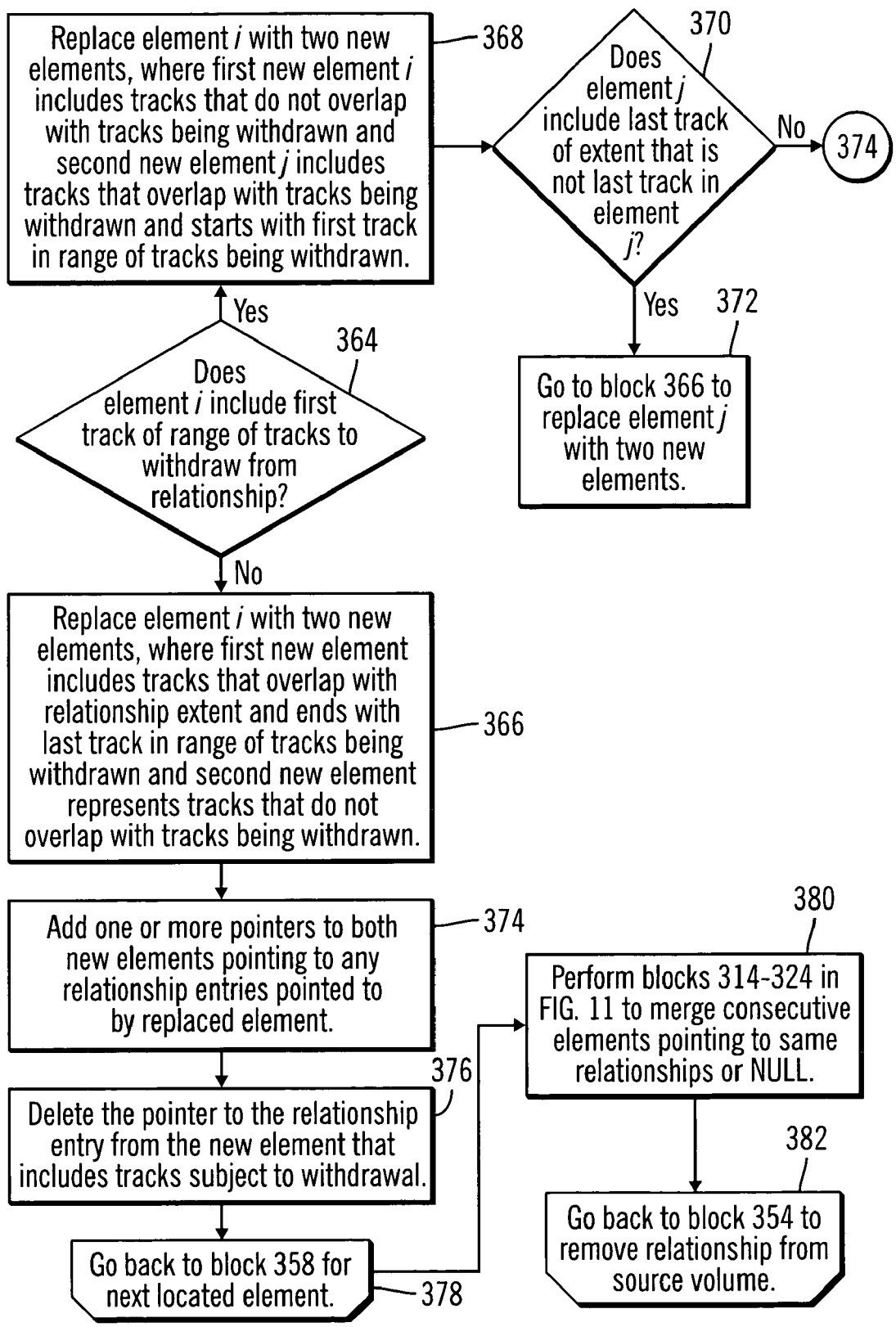

FIGS. 12a and 12b illustrate operations performed in the storage management software 18 to remove a subset of contiguous tracks from an extent in a point-in-time copy relationship. This operation may be performed if a portion of tracks in a relationship extent have been copied from the source and target and to make such copied tracks in the source and target available for further point-in-time relationships. Further, tracks may be removed from an extent in other situations, such as in response to a request from an administrator. With respect to FIG. 12a, upon initiating the operation (at block 350) for a partial withdrawal to withdraw a subset of the tracks in a relationship extent, a determination is made (at block 352) from the relationship metadata 102 in the source and target volumes the extent of source and target tracks of the deleted relationship. The withdrawal request may provide the relationship ID or relationship extents, which can then be used to query relationship metadata 102 to locate the source and target volumes including metadata on the relationship subject to the partial withdrawal. A loop from blocks 354 through 378 in FIG. 12b is performed first for the target volume in the relationship and then second for the source volume to withdraw a subset of tracks from extent of tracks subject to the relationship. At block 356, the storage management software 18 locates the one or more elements 130 that include the tracks subject to the partial withdrawal. An inner loop is then performed at blocks 358 through 372 in FIG. 12b for each located element i including the tracks to withdraw. If (at block 360) all tracks represented by element i are subject to the withdrawal from the relationship, then the pointer 136 in element i to the relationship entry 140 subject to withdrawal is removed (at block 362).

If (at block 360) all tracks represented by element i are not subject to the withdrawal, then a determination is made (at block 364 in FIG. 12b) whether element i includes the last track in the range of tracks to withdraw from relationship. If element i includes the last track of the range to withdraw (from the no branch of block 364), then element i is replaced (at block 366) with two new elements, where the first new element includes tracks that overlap with the relationship extent and ends with the last track in the range of tracks being withdrawn and the second new element represents tracks that do not overlap with tracks being withdrawn. If (from the yes branch of block 364) element i includes the first track of the range to withdraw, then element i is replaced (at block 368) with two new elements, where the first new element i includes tracks that do not overlap with the tracks being withdrawn and the second new element j includes tracks that overlap with tracks being withdrawn and starts with the first track in range of tracks being withdrawn. If (at block 370) element j includes the last track of the extent that is also not the last track in element j, then the operation at block 366 is performed (at block 372) for element j to perform a further split to extract tracks at the end of element j that do not overlap with the extent and place such non-overlapping tracks in a further element. The two or three new elements would be added in the linked list of elements where the replaced element was located. From block 366 or 370, control proceeds to block 374 to add one or more pointers 136 to both new elements pointing to any relationship entries pointed to by the replaced element i and deletes (at block 376) the pointer 136 to the relationship entry 140 from the new element that includes tracks subject to withdrawal. Control then proceeds (at block 378) back to block 358 to remove any of the tracks subject to withdrawal from the relationship subject to withdrawal. After removing the tracks from the relationship subject to withdrawal, then the storage management software 18 performs (at block 380) steps 314 through 324 in FIG. 11 to merge consecutive elements 130 pointing to the same relationship entries or pointing to no relationship entry. After removing the tracks from the relationship for the target volume, control proceeds (at block 382) back to block 354 to remove the tracks in the relationship from the source volume.

The result of the operations in FIGS. 12a and 12b is that a subset of tracks in a relationship extent are removed from the relationship in the source and target IMRTs 20 and volume metadata, while the relationship remains with respect to those tracks not subject to the partial withdrawal. After the withdrawal, withdrawn tracks from the extent are then available to be used in further established relationships. Further, destage and stage for such withdrawn tracks may occur without having to perform additional intercept checking.

In alternative implementations, the logic of FIG. 12 may not be used when withdrawing a portion of a relationship. Instead, one or more relationships may be added by performing the operations of FIGS. 10a, 10b to replace an old (preexisting) relationship, where the source and/or target extents in the new relationship are a subset of the extents of the old relationship. Subsequently the logic of FIG. 11 would be used to remove the extents that constitute the old (preexisting) relationship.

Figure 13:
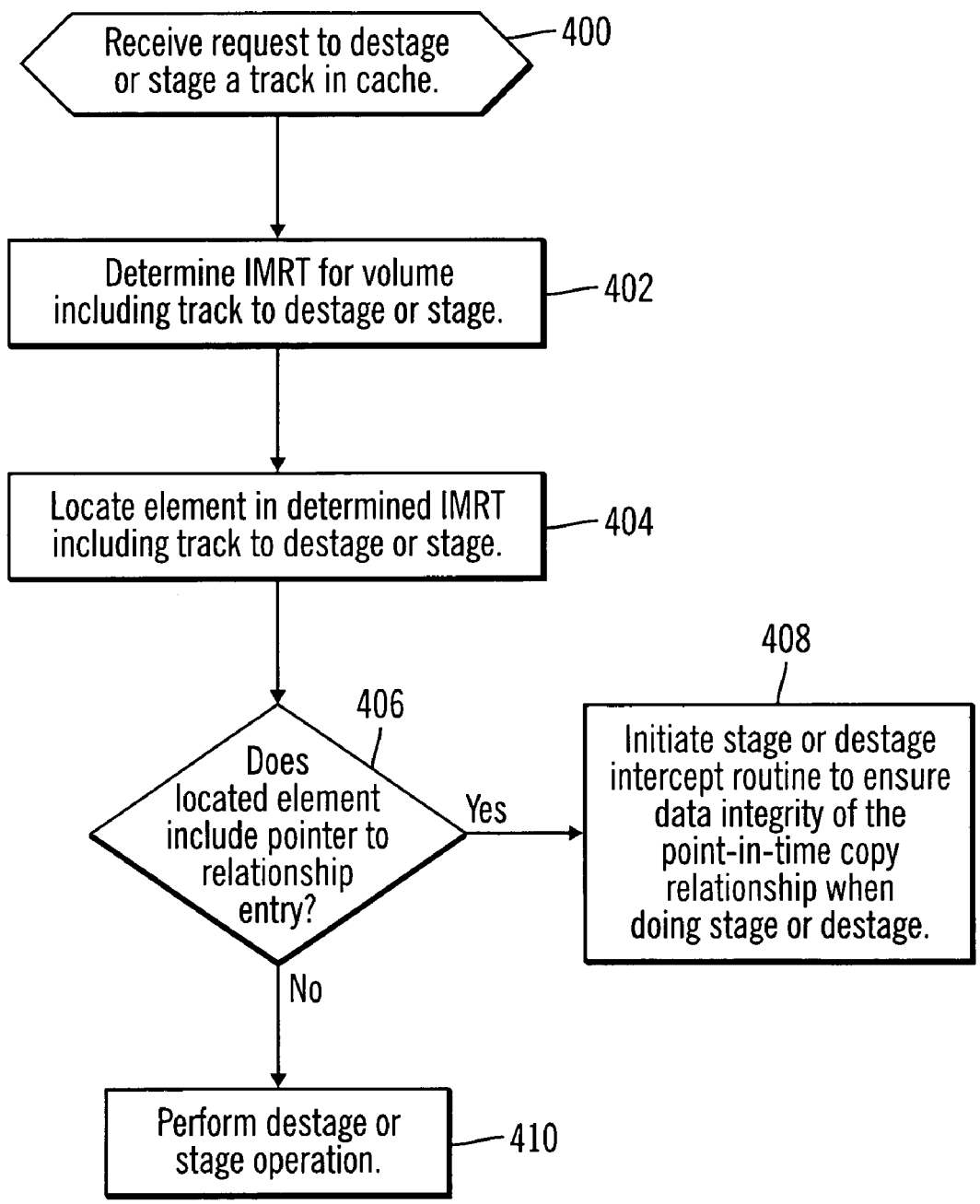
FIG. 13 illustrates operations to consider relationships when destaging and staging tracks from cache in accordance with implementations of the invention.

FIG. 13 illustrates operations performed by the storage management software 18 to use the IMRTs 20 in memory 16 to perform destage and stage operations in accordance with implementations of the inventions. Upon receiving (at block 400) a request to destage or stage a track in cache 14a, 14b, the IMRT 20 for the volume including the track to destage or stage is determined (at block 402) and the element 130 in the determined IMRT 20 including the track to stage or destage is located (at block 404). If (at block 406) the located element includes a pointer 136 (FIG. 7) to a relationship entry 140, then the storage management software 18 initiates (at block 408) a stage or destage intercept routine to ensure data integrity of the point-in-time copy relationship when doing the stage or destage. The stage or destage intercept will ensure that the source track is copied to the corresponding target track(s) or staged to the target cache 14b in the point-in-time copy relationship(s) before performing the target stage or source destage. The relationship entries 140 would be processed to locate the relationship metadata 102 and bitmap 102 to determine whether the tracks have been copied from the source to target and to determine how to handle the stage or destage intercept. Otherwise, if (at block 406) the located element 130 does not include a pointer 136 to a relationship entry 140, then the destage or stage of the track is performed.

Figure 14:
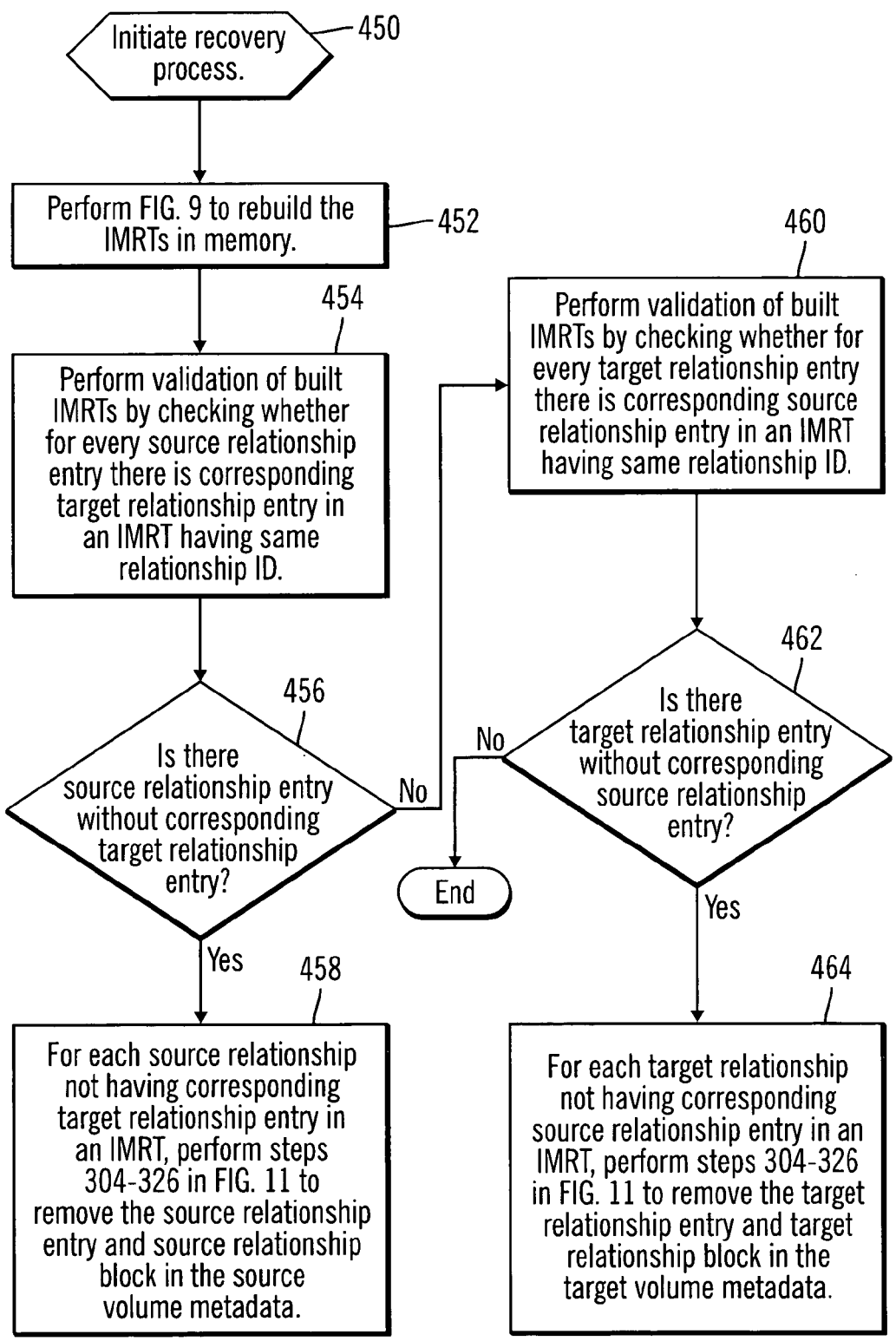
FIG. 14 illustrates operations to perform a recovery process in accordance with implementations of the invention.

FIG. 14 illustrates operations performed by the storage management system 18 to initiate an error recovery process, which may be performed in response to a cold start after a power loss, a warm start initialization or rebooting without a power loss, or other detected error condition. Upon initiating (at block 450) the error recovery process, the storage management software 18 performs the operations in FIG. 9 to rebuild the IMRTs 20 in memory for all volumes managed by the storage controller 2. In certain implementations, the IMRTs are only rebuilt if the memory was lost or the IMRT is in an inconsistent state or corrupted. The storage management software 18 then performs (at block 454) a validation operation to consider the built IMRTs 20 by checking whether for each source relationship entry representing a source in a relationship, there is a corresponding target relationship entry in an IMRT having the same relationship ID. As discussed, the relationship entry 140 may include relationship information 150 (FIG. 8), such as whether the volume for which the relationship entry 140 is defined is for a source or target and a relationship ID. The storage management software 18 upon locating a relationship entry 140 for a source may then query other relationship entries 140 in the same or different IMRTs 20, as well as information in the non-volatile relationship metadata 162, to determine whether one IMRT includes a relationship entry 140 that indicates a target having the same relationship ID. If (at block 456) a target relationship entry was not built within one IMRT 20, then control proceeds (at block 458) to perform blocks 304–326 in FIG. 11 to remove the relationship block 104a, 104b . . . 104n in the source relationship metadata 102 and remove the relationship entry 140 from the source IMRT 20.

If (at block 456) there is a target relationship entry corresponding to each located source relationship entry, then the storage management software 18 performs (at block 460) a validation operation to consider the built IMRTs 20 by checking whether for each target relationship entry representing a source in a relationship, there is a corresponding source relationship entry in an IMRT having the same relationship ID, and vice versa for each source in a relationship. The storage management software 18 upon locating a relationship entry 140 for a target may then query other relationship entries 140 in the same or different IMRTs 20 to determine whether one IMRT includes a relationship entry 140 whose relationship information 150 indicates that the relationship entry 140 is for a source having the same relationship ID. If (at block 462) a source relationship entry was not built within one IMRT 20, then control proceeds (at block 464) to perform blocks 304–326 in FIG. 11 to remove the relationship block 104a, 104b . . . 104n in the target relationship metadata 102 and remove the relationship entry 140 from the target IMRT 20.

ADDITIONAL IMPLEMENTATION DETAILS

The described techniques for establishing and managing a point-in-time copy relationship may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described implementations for establishing a logical point-in-time copy relationship were described for use with systems deployed in a critical data environment where high availability is paramount. However, those skilled in the art will appreciate that the point-in-time copy operations described herein may apply to storage systems used for non-critical data where high availability is not absolutely necessary.

The source and target cache may be implemented in a same memory device or separate memory devices.

The described techniques for managing point-in-time copy relationships may apply when the source and target tracks have the same or different track numbers.

In described implementations, the relationship concerned a point-in-time copy relationship between tracks in different volumes. In alternative implementations, the relationship may comprise additional types of copy or data relationships known in the art.

The illustrated logic of FIGS. 9–14 shows certain events occurring in a certain order. In alternative implementations, certain operations may be performed in a different order, modified or removed. Moreover, steps may be added to the above described logic and still conform to the described implementations. Further, operations described herein may occur sequentially or certain operations may be processed in parallel. Yet further, operations may be performed by a single processing unit or by distributed processing units.

The variables n and m are used to denote any integer variable for certain of the described elements and may indicate a same or different integer value when used in different instances.

Figure 15:
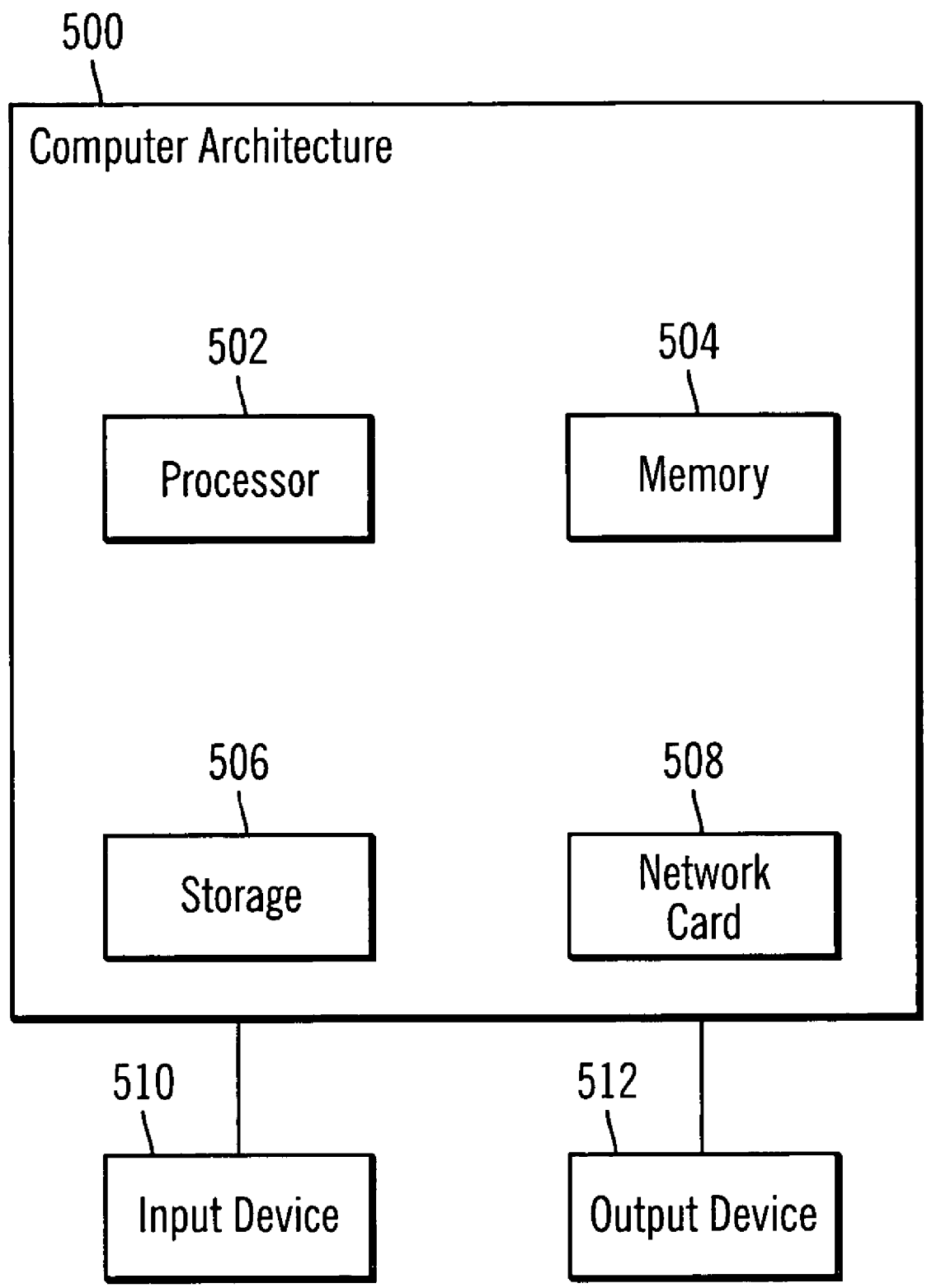
FIG. 15 illustrates an architecture of computing components in the network environment, such as the hosts and storage controller, and any other computing devices.

FIG. 15 illustrates one implementation of a computer architecture 500 of the network components, such as the hosts and storage controller shown in FIG. 1. The architecture 500 may include a processor 502 (e.g., a microprocessor), a memory 504 (e.g., a volatile memory device), and storage 506 (e.g., a non-volatile storage, such as magnetic disk drives, optical disk drives, a tape drive, etc.). The storage 506 may comprise an internal storage device or an attached or network accessible storage. Programs in the storage 506 are loaded into the memory 504 and executed by the processor 502 in a manner known in the art. The architecture further includes a network card 508 to enable communication with a network. An input device 510 is used to provide user input to the processor 502, and may include a keyboard, mouse, pen-stylus, microphone, touch sensitive display screen, or any other activation or input mechanism known in the art. An output device 512 is capable of rendering information transmitted from the processor 502, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

The described implementations provide techniques for managing a point-in-time copy relationship that allows source and target tracks in one relationship to have different track numbers. Allowing source and target tracks in one relationship to reside on different track numbers provides added flexibility when establishing point-in-copy relationships and allows for more combinations of point-in-time copy relationships to be established.

What is claimed is:

1. A method for managing a relationship between one target volume and one source volume, comprising:
   for each of the source volume and target volume, generating in memory:
   (i) at least one element, wherein each element represents a range of sequential data units in the volume;
   (ii) at least one relationship entry, wherein each relationship entry represents one relationship;
   (iii) at least one element pointer associating one element with one relationship entry, wherein the data units represented by the element are part of the relationship represented by the relationship entry that the pointer associates with the element; and
   (iv) one relationship pointer for each relationship entry associating the relationship entry with volume metadata, wherein the volume metadata provides information on the relationship represented by the relationship entry.

2. The method of claim 1, wherein the source and target volume metadata is stored in non-volatile storage within the source and target volumes, respectively.

3. The method of claim 2, further comprising:
   processing the volume metadata to generate in memory the at least one element, the at least one relationship entry, the at least one element pointer, and the at least one relationship pointer.

4. The method of claim 3, wherein the volume metadata is processed on a plurality of volumes, and wherein one set of elements, relationship entries, element pointers, and relationship pointers are generated for each volume including volume metadata identifying relationships of the volume to one other volume.

5. The method of claim 4, further comprising:
   if the volume metadata in one volume does not identify any relationships in which the volume is included, then indicating that there are no elements in the memory for the volume representing all user data units on the volume.

6. The method of claim 3, further comprising:
   determining whether for each relationship, there is source and target relationship information generated in the memory;
   if there is no target relationship information generated in the memory for one determined relationship, then removing the source relationship information for the determined relationship from the memory and removing the relationship information from the source volume metadata for the determined relationship; and
   if there is no source relationship information generated in the memory for one determined relationship, then removing the target relationship information for the determined relationship from the memory and removing the relationship information from the target volume metadata for the determined relationship.

7. The method of claim 6, wherein removing the source or target relationship information from memory comprises removing from the memory the relationship entry, the at least one element pointer, and the relationship pointer generated for the source volume in the relationship.

8. The method of claim 1, wherein the volume metadata further comprises:
   a relationship bitmap including a bit indicating whether one source data unit has been copied over to the corresponding target data unit in the relationship.

9. The method of claim 1, wherein the volume metadata further comprises:
   a relationship block for each copy relationship including data units from the volume, wherein the relationship block indicates whether the data units in the volume are a target or source in the relationship and an extent of data units in the volume within the relationship.

10. The method of claim 1, wherein generating in the memory the at least one element further comprises:
    processing the volume metadata to determine each range of data units included in each relationship; and
    generating one element for each range of data units included in at least one relationship.

11. The method of claim 10, wherein generating in the memory the at least one element further comprises:
    generating elements including ranges of data units preceding or subsequent to ranges of data units in elements included in one relationship, wherein all the generated elements together represent all user data units in the volume, including ranges of data units in relationships and ranges of data units not included in relationships.

12. The method of claim 10, wherein each generated element is linked to at least one element, wherein linked elements include contiguous ranges of data units.

13. The method of claim 1, wherein the volume metadata includes one relationship block including relationship information for each relationship indicated in the volume metadata, wherein generating the relationship entry and the relationship pointer further comprises:
    generating one relationship entry for each relationship identified in the volume metadata, wherein the relationship entry includes a subset of the relationship information included in the volume metadata, wherein each relationship pointer associating one relationship entry with the volume metadata associates one relationship entry with the corresponding relationship block representing the relationship.

14. The method of claim 1, further comprising:
receiving a request to stage or destage a data unit from a cache;
determining whether the requested data unit is included in a range of data units represented by one element having one element pointer associating the element with a relationship entry;
if the requested data unit is included within one element associated with a relationship, determining whether the requested data unit was copied to the target data unit; and
if the source data unit was not copied to the target data unit, then copying the source data unit to the target data unit before performing the stage or destage operation.

15. The method of claim 1, wherein the relationship between the source and target volumes comprises a point-in-time copy relationship.

16. The method of claim 1, wherein the source data unit and corresponding target data unit in one relationship have different data unit numbers.

17. A system for managing a relationship between one target volume and one source volume, comprising:
a memory including for each of the source volume and target volume:
(i) at least one element, wherein each element represents a range of sequential data units in the volume;
(ii) at least one relationship entry, wherein each relationship entry represents or relationship;
(iii) at least one element pointer associating one element with one relationship entry, wherein the data units represented by the element are part of the relationship represented by the relationship entry that the pointer associates with the element; and
(iv) one relationship pointer for each relationship entry associating the relationship entry with volume metadata, wherein the volume metadata provides information on the relationship represented by the relationship entry.

18. The system of claim 17, wherein the source and target volume metadata is stored in non-volatile storage within the source and target volumes, respectively.

19. The system of claim 18, further comprising:
means for processing the volume metadata to generate in memory the at least one element, the at least one relationship entry, the at least one element pointer, and the at least one relationship pointer.

20. The system of claim 19, wherein the volume metadata is processed on a plurality of volumes, and wherein one set of elements, relationship entries, element pointers, and relationship pointers are generated for each volume including volume metadata identifying relationships of the volume to one other volume.

21. The system of claim 17, further comprising:
means for processing the volume metadata to determine each range of data units included in each relationship; and
means for generating one element for each range of data units included in at least one relationship.

22. The system of claim 21, further comprising:
means for generating elements including ranges of data units preceding or subsequent to ranges of data units in elements included in one relationship, wherein all the generated elements together represent all user data units in the volume, including ranges of data units in relationships and ranges of data units not included in relationships.

23. The system of claim 17, wherein the volume metadata includes one relationship block including relationship information for each relationship indicated in the volume metadata, further comprising:
means for generating one relationship entry for each relationship identified in the volume metadata, wherein the relationship entry includes a subset of the relationship information included in the volume metadata, wherein each relationship pointer associating one relationship entry with the volume metadata associates one relationship entry with the corresponding relationship block representing the relationship.

24. An article of manufacture comprising a computer readable medium having code adapted for managing a relationship between one target volume and one source volume, wherein the code causes operations to be performed, the operations comprising:
for each of the source volume and target volume, generating in memory:
(i) at least one element, wherein each element represents a range of sequential data units in the volume;
(ii) at least one relationship entry, wherein each relationship entry represents one relationship;
(iii) at least one element pointer associating one element with one relationship entry, wherein the data units represented by the element are part of the relationship represented by the relationship entry that the pointer associates with the element; and
(iv) one relationship pointer for each relationship entry associating the relationship entry with volume metadata, wherein the volume metadata provides information on the relationship represented by the relationship entry.

25. The article of manufacture of claim 24, wherein the source and target volume metadata is stored in non-volatile storage within the source and target volumes, respectively.

26. The article of manufacture of claim 25, wherein the operations further comprise:
processing the volume metadata to generate in memory the at least one element, the at least one relationship entry, the at least one element pointer, and the at least one relationship pointer.

27. The article of manufacture of claim 26, wherein the volume metadata is processed on a plurality of volumes, and wherein one set of elements, relationship entries, element pointers, and relationship pointers are generated for each volume including volume metadata identifying relationships of the volume to one other volume.

28. The article of manufacture of claim 27, wherein the operations further comprise:
if the volume metadata in one volume does not identify any relationships in which the volume is included, then indicating that there are no elements in the memory for the volume representing all user data units on the volume.

29. The article of manufacture of claim 26, wherein the operations further comprise:
determining whether for each relationship, there is source and target relationship information generated in the memory;
if there is no target relationship information generated in the memory for one determined relationship, then removing the source relationship information for the determined relationship from the memory and removing the relationship information from the source volume metadata for the determined relationship; and if there is no source relationship information generated in the memory for one determined relationship, then removing the target relationship information for the determined relationship from the memory and removing the relationship information from the target volume metadata for the determined relationship.

30. The article of manufacture of claim 29, wherein removing the source or target relationship information from memory comprises removing from the memory the relationship entry, the at least one element pointer, and the relationship pointer generated for the source volume in the relationship.

31. The article of manufacture of claim 24, wherein the volume metadata further comprises:

a relationship bitmap including a bit indicating whether one source data unit has been copied over to the corresponding target data unit in the relationship.

32. The article of manufacture of claim 24, wherein the volume metadata further comprises:

a relationship block for each copy relationship including data units from the volume, wherein the relationship block indicates whether the data units in the volume are a target or source in the relationship and an extent of data units in the volume within the relationship.

33. The article of manufacture of claim 24, wherein generating in the memory the at least one element further comprises:

processing the volume metadata to determine each range of data units included in each relationship; and generating one element for each range of data units included in at least one relationship.

34. The article of manufacture of claim 33, wherein generating in the memory the at least one element further comprises:

generating elements including ranges of data units preceding or subsequent to ranges of data units in elements included in one relationship, wherein all the generated elements together represent all user data units in the volume, including ranges of data units in relationships and ranges of data units not included in relationships.

35. The article of manufacture of claim 33, wherein each generated element is linked to at least one element, wherein linked elements include contiguous ranges of data units.

36. The article of manufacture of claim 24, wherein the volume metadata includes one relationship block including relationship information for each relationship indicated in the volume metadata, wherein generating the relationship entry and the relationship pointer further comprises:

generating one relationship entry for each relationship identified in the volume metadata, wherein the relationship entry includes a subset of the relationship information included in the volume metadata, wherein each relationship pointer associating one relationship entry with the volume metadata associates one relationship entry with the corresponding relationship block representing the relationship.

37. The article of manufacture of claim 24, further in communication with a cache, wherein the operations further comprise:

receiving a request to stage or destage a data unit from the cache;

determining whether the requested data unit is included in a range of data units represented by one element having one element pointer associating the element with a relationship entry;

if the requested data unit is included within one element associated with a relationship, determining whether the requested data unit was copied to the target data unit; and if the source data unit was not copied to the target data unit, then copying the source data unit to the target data unit before performing the stage or destage operation.

38. The article of manufacture of claim 24, wherein the relationship between the source and target volumes comprises a point-in-time copy relationship.

39. The article of manufacture of claim 24, wherein the source data unit and corresponding target data unit in one relationship have different data unit numbers.

* * * * *